United States Patent [19]

Hetland et al.

[11] Patent Number: 4,920,500
[45] Date of Patent: Apr. 24, 1990

[54] METHOD AND ROBOT INSTALLATION FOR PROGRAMMED CONTROL OF A WORKING TOOL

[75] Inventors: Amund Hetland, Voll; Odd T. Høie, Sandnes, both of Norway

[73] Assignee: Trallfa Robot A/S, Bryne, Norway

[21] Appl. No.: 112,720

[22] PCT Filed: Feb. 25, 1986

[86] PCT No.: PCT/NO86/00021

§ 371 Date: Oct. 28, 1987

§ 102(e) Date: Oct. 28, 1987

[87] PCT Pub. No.: WO87/04968

PCT Pub. Date: Aug. 27, 1987

[51] Int. Cl.$^5$ .................. G06F 15/46; G05B 19/42
[52] U.S. Cl. .................. 364/513; 318/568.13; 318/568.19; 364/193; 901/3
[58] Field of Search ............ 364/513, 191–193, 364/474.36, 478; 414/730; 318/568, 568.13, 568.19; 901/3–5, 43, 15

[56] References Cited

U.S. PATENT DOCUMENTS

| | | | |
|---|---|---|---|
| 3,909,600 | 9/1975 | Hohn | 364/513 |
| 3,920,972 | 11/1975 | Corwin, Jr. et al. | 364/513 |
| 4,178,632 | 12/1979 | Anthony | 901/5 X |
| 4,604,716 | 8/1986 | Kato et al. | 364/513 |
| 4,612,487 | 9/1986 | Shimomura | 364/513 X |
| 4,613,943 | 9/1986 | Miyake et al. | 364/513 |

Primary Examiner—Joseph Ruggiero
Attorney, Agent, or Firm—Watson, Cole, Grindle & Watson

[57] ABSTRACT

Method and apparatus in a robot installation for programmed control of a working tool to perform processing operations on an object by a movable servo-actuated robot arm system with more than six degrees of freedom and including a data memory for storing preprogrammed tool path data. A coordinate transformation module derives and stores in the memory the preprogrammed tool path data defined in an outer coordinate system without physical connection with the robot arm system. The robot arm system is subdivided into system parts movable relative to each other and each system part having at most six degrees of freedom, thereby enabling suitable coordinate transformation to an inner reference coordinate system associated with the robot arm. Sensor devices obtain positional data for each system part, apart from at least one system part connected with the inner reference coordinate system. The program control of the working tool is correlated in accordance with the stored tool path data defined in the outer coordinate system at all times with the inner coordinate system associated with the robot arm system using the positional data together with the positional data obtained from the sensors as to the positional relationship between the inner and outer coordinate systems as coordinate transformation data.

12 Claims, 2 Drawing Sheets

METHOD AND ROBOT INSTALLATION FOR PROGRAMMED CONTROL OF A WORKING TOOL

BACKGROUND OF THE INVENTION

1. Field of the Invention

The present invention is related to a method and a robot installation for programmed control of a working tool to perform processing operations on an object by means of a servo-actuated robot arm system.

2. Related Art

When such arm system not merely is to take care of the required tool movements with respect to the object, but also to bring and maintain the working tool and its motive means at all times in appropriate position with respect to the object in question, which possibly also may be in motion, it may in practice often be necessary or suitable to utilize a robot arm system having more than six degrees of freedom.

It is trivial to find the position of a tool from its axis coordinates in a given coordinate system, even in case the tool is moved by means of an arm system having more than six degrees of freedom. With such high number of degrees of freedom an over-determinate equation system is however necessary, if the corresponding coordinates for the various motional axes of the arm system are to be determined on the basis of the position of the tool. With programming and operation of a robot having such an arm system. it is consequently necessary to use unconventional methods for deriving and storing the necessary positional and motional data for the working tool and the various parts of the robot arm system.

SUMMARY OF THE INVENTION

Thus, it is an object of the invention to arrive at a method for programmed control of a working tool to perform processing operations on an object by means of a movable servo-actuated robot arm system having more than six degrees of freedom and on the basis of preprogrammed tool path data stored in a data memory. This is achieved according to the invention by the features that the stored tool path data are derived in an outer coordinate system without physical connection with the robot arm system, which for coordinate transformation to an inner referance coordinate system associated with the robot arm system is considered subdivided into system parts which are movable with respect to each other and each having at most six degrees of freedom, the positional data for each system part, apart from one system part which is connected with the inner reference coordinate system, being derived and stored in the memory in addition to the programmed tool path data, and utilized, possibly together with directly sensor-derived information as to the positional relation between said inner and outer coordinate systems, as coordinate transformation data for appropriately correlating the programmed control of the working tool on the basis of the stored tool path data in the outer coordinate system at all times with the inner reference coordinate system associated with the robot arm system.

Said tool path data and coordinate transformation data are suitably derived in principally known manner by manual control of the working tool and the robot arm system during the programmation. Such control may take place by continuous manual guidance along the intended motional paths with a passive servo system or by manually controlled positional adjustments point by point of said servo system along said motional paths.

In this case the programing is performed according to the invention in the manner that each system part, apart from the system part connected with the inner reference coordinate system, for the derivation and storage of its positional data during the manual control at all times is individually placed in such positional relation to the outer coordinate system that the working tool may be guided to performing its intended processing operations by means of said system part which is connected with the inner reference coordinate system, and thus deriving said tool path data in the outer coordinate system and coordinate transformed from said inner reference coordinate system.

For reproduction of the manually programmed movements of the working tool and the robot arm system the positional data stored in the memory during the performance of the processing operations of the working tool are supplied to their respective individually associated system parts for the control of a servo-actuated system associated with each system part and at all times coordinately transformed to the outer coordinate system in accordance with the data in question, at the same time as the stored tool path data are supplied to that system part which is connected with the inner reference coordinate system.

Preferably, the outer coordinate system is physically connected with and follows the movements of the object which is subject to said processing operations.

The invention also concerns a robot installation for programmed control of a working tool to perform processing operations on an object, the installation comprising a movable servo-actuated robot arm system having more than six degrees of freedom and a data memory for storing preprogrammed tool path data. On this background of principally known prior art the robot installation according to the invention further includes a coordinate transformation module disposed and operatively adapted for deriving and storing in the memory said programmed tool path data defined in an outer coordinate system without physical connection with the robot arm system, which for achieving suitable coordinate transformation to an inner reference coordinate system associated with the robot arm are subdivided into system parts which are movable relative to each other and each has at most six degrees of freedom, and for deriving by means of sensor devices and storing in the memory positional data for each system part, apart from one system part which is connected with the inner reference coordinate system, and utilizing such positional data, possibly together with directly sensor-derived information as to the positional relations between said inner and outer coordinate systems, as coordinate transformation data for appropriately correlating the programmed control of the working tool in accordance with the stored tool path data defined in the outer coordinate system at all time with the inner coordinate system associated with the robot arm system.

In a simple and practically suitable embodiment of the robot installation according to the invention the robot arm system is subdivided into at least one first system part having comparatively low motional inertia and being disposed and operatively adapted for guiding the working tool in accordance with the stored tool path data, and at least one second system part having considerably higher motional inertia and being disposed for coarse-positioning the first-mentioned system part in agreement with said coordinate transformation data and with respect to the object in question, for performing said processing operations. The outer coordinate system is then suitably connected with and follows any movement of the object to be subjected to the processing operations.

Regarding the above method and installation according to the invention, it would be evident that the present invention also comprises the analogue case in which the positions of the working tool and the object are interchanged, which implies that the working tool is essentially stationary in operation, whereas the object is moved with respect to the tool in such a way and in agreement with the stored tool path data and coordinate transformation data that the object is subjected to the intended processing operations.

BRIEF DESCRIPTION OF THE DRAWINGS

The invention will now be described in more detail with reference to the accompanying drawings, on which

Figure 1:
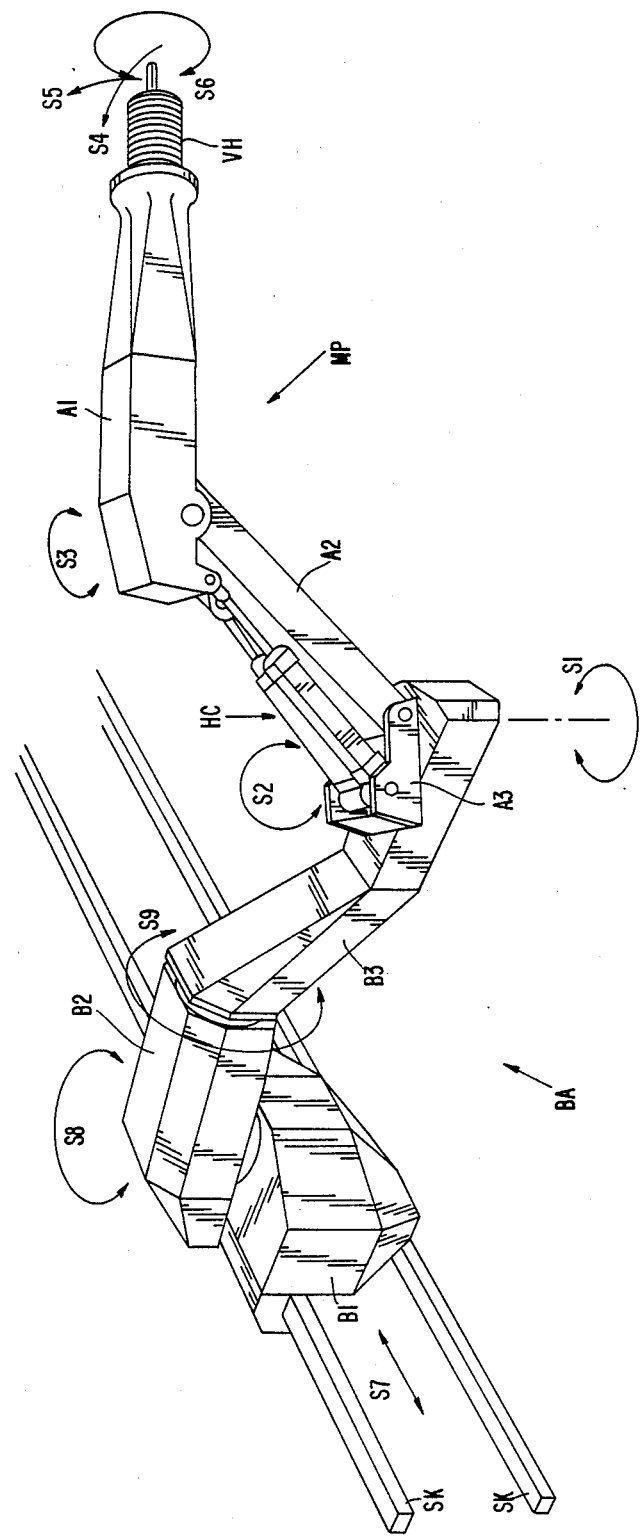
FIG. 1 shows a robot arm system according to the invention and having nine degrees of freedom.

The illustrated servo arm system in FIG. 1 consists of a carrier arm BA in three portions and having three degrees of freedom, as well as a manipulator arm MP mounted on the carrier arm and designed for controlled movement of a working tool having six degrees of freedom. At its extreme end the manipulator arm is provided with a tool socket VH with a mounting shaft for fixation of a jet spray gun for the painting of motorcars. The mounting shaft is rotatable about its own axis and two further axes which are perpendicular to each other and to the mounting shaft. These rotational axes are schematically indicated by arrows and the designations S4, S5 and S6.

The tool socket VH is mounted on the extreme end of a rigid arm A1, which in turn is pivotably disposed at the one end of a further rigid arm A2, the other end of which is pivotably mounted on a base member A3 for the manipulator arm MP. The axes for the pivotal movements of the arms A1, A2 relative to each other and to the base member A3 are indicated by curved arrows S2 and S3, the pivotal movements being actuated by the shown hydraulic cylinders HC.

The base member A3 of the manipulator arm is rotationally mounted on the extreme end of the carrier arm BA for pivotal movements about an axis S1, which is indicated by a curved arrow in FIG. 1. Thus, the manipulator arm MP as a whole has six degrees of freedom through the described pivotal movements about the axes S1-S6.

The carrier arm BA includes three portions, i.e. a first portion B1 disposed for translational movements back and forth on wall-mounted rails SK along a translational axis S7. On this first portion B1 an intermediate portion B2 is mounted for pivotal movement about a vertical axis S8.

This intermediate portion carries in turn the third portion B3 of the carrier arm, which is mounted for pivotal movements about a horizontal axis S9 with respect to the second or intermediate portion B2. As shown in FIG. 1, this third, outer portion B3 consists of a slanting section adjacent the horizontal pivotal axis and a horizontal section at the extreme end of this portion and serving as platform for pivotable mounting of the base member A3 of the manipulator arm.

Thus, the illustrated robot arm system in FIG. 1 has totally nine degrees of freedom, and for the programmation of the movements of the working tool and the arm system it is in accordance with the invention considered subdivided in several system parts having each at most six degrees of freedom, i.e. a first system part having three degrees of freedom and consisting of the carrier arm BA, and a second system part consisting of a manipulator arm MP and having six degrees of freedom. The programming is then performed in two steps. On the one hand tool path data for the working tool is derived in an outer coordinate system, which is not physically connected with the robot arm system, but rather with the object to be processed, by manually guiding the working tool in the intended movement pattern with respect to the object. On the other hand the carrier arm is controlled or guided manually with its three degrees of freedom in such a manner that the manipulator arm at all times is suitably coarse-positioned in such a way with respect to the object that the working tool may be guided in the intended movement pattern relative to said object. Through this manually determined movement of the carrier arm positional data for the various motional axes of the carrier arm are derived, and these positional data are stored in a data memory together with the derived tool path data for the working tool.

During the reproduction of the movements which are taught to the robot arm system, the stored positional data for the carrier arm are then utilized as coordinate transformation data for appropriately correlating the programmed control of the working tool on the basis of the stored tool path data in the outer coordinate system at all times with the inner reference coordinate system of the robot arm system, which is physically connected with the manipulator arm MP.

By the fact that the robot arm system on the one hand is controlled by stored tool path data with respect to the object (the outer coordinate system) and on the other hand by the stored positional data for the carrier arm with respect to the same object, the motional pattern of the six-axed manipulator arm MP may be set as the "motional difference" between the intended tool path and the movement of the carrier arm. In other words, this implies a coordinate transformation between the outer coordinate system and the inner reference coordinate system, which is associated with the manipulator arm. Through the fact that the robot arm system is subdivided into an easily movable manipulator arm MP and a solid, but somewhat motionally inert carrier arm, substantial dynamic advantages are achieved. Thus, the easily movable manipulator arm, and in particular the tool socket at its extreme end, takes care of the fast movements of the tool, i.e. the jet spray gun in the present case, whereas the heavy and inert carrier arm takes care of the displacement and suitable coarse-positional adjustments of the manipulator arm with respect to the object to be processed.

Thus, the part of the robot arm system having the highest weight and inertia, i.e. the carrier arm, does not need to follow the fine-structural pattern of the tool movement, and possible lag in the servo systems of the carrier arm may easily be compensated by the manipulator arm by means of the coordinate transformation which is performed according to the invention.

Figure 2:
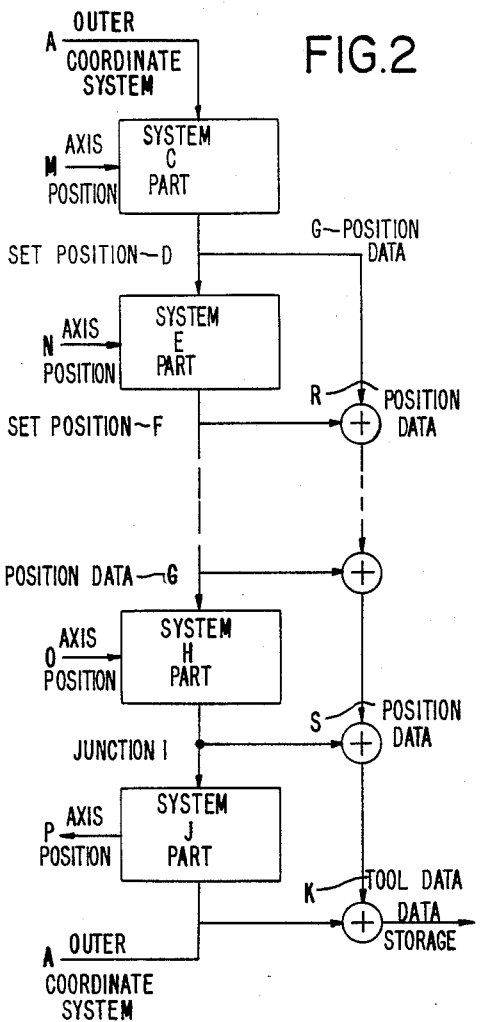
FIG. 2 is a combined flow and block diagram illustrating the various process steps included in the programming or teaching of a robot installation according to the invention.

FIG. 2 illustrates the basic coordinate transformation principle according to the invention for a robot arm system having an arbitrary number of system parts, of which only the first two C, E and the last ones H, J are shown in the figure, whereas it is indicated that an arbitrary number of further system parts may be included between the parts E and H. Each of the system parts has at most six degrees of freedom, in order that its position is unambiguously defined in an ordinary three-dimentional coordinate system with six motional axes.

During the programming or teaching of the robot installation the axis positions M for the first system part C are set in the outer coordinate system A. These positional data G for the first system part C are transferred for storage in the memory together with further positional data, as indicated on the right hand side of FIG. 2. At the same time the set position D also influences the next system part E, which is manually adjusted to the axis positions N, as indicated by the corresponding arrow. Positional data R for the system part E are then transferred for storage in similar manner as the positional data G for the system part C, along the arrow line on the right hand side of FIG. 2. The set position F in the outer coordinate system will then in turn also influence the next system part, which is manually adjusted in the same manner as the system parts C and E.

In similar manner the manual programmed adjustment of the robot arm system continues part by part towards the last but one system part H, which is set to its axis positions O. The corresponding positional data S in the outer coordinate system are then transferred together with the positional data for the other system parts along said data bus on the right hand side of FIG. 2 for storage L. Tool path data K for the working tool in the outer coordinate system are derived by manually guiding the last system part J and supplied to the data bus for storage L together with the coordinate transformation data for the remaining system parts. The axis positions P for the last system part are then defined, on the one hand by the earlier manually adjusted system parts C, E, H and on the other hand by the directly derived tool path data in the outer coordinate system A.

Figure 3:
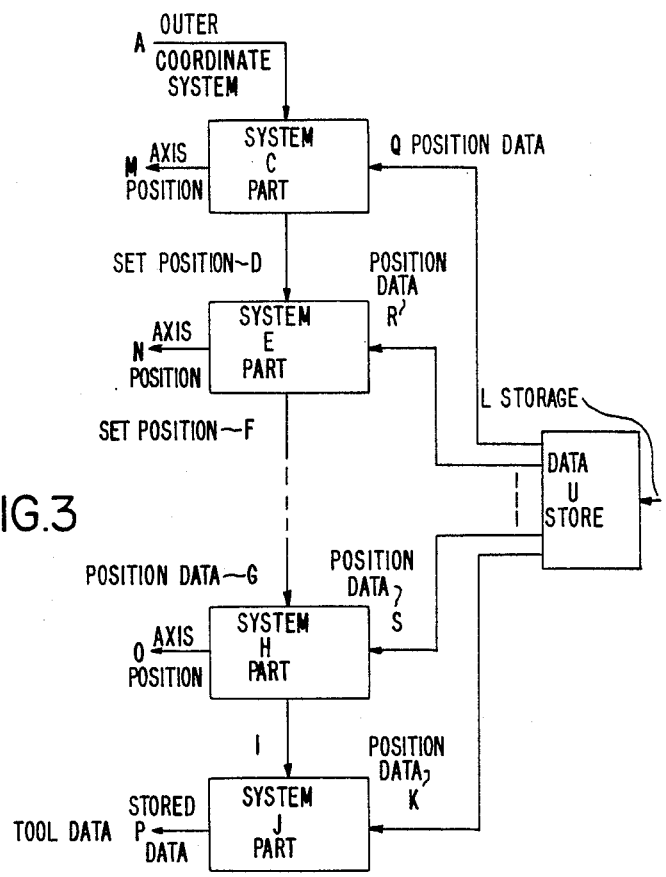
FIG. 3 is another combined flow and block diagram, which shows the distribution and utilization during the operation of the robot installation, of the stored tool path data and coordinate transformation data derived during programing.

In FIG. 3 it is shown that all data for storage L are transferred to the data store U. During the servo-actuated operation of the robot installation for reproduction of the taught or programmed movements of the working tool and the robot arm system, the stored positional data Q, R, S are supplied as coordinate transformation data to the respective associated system parts, i.e. C, E and H, respectively, for appropriate continuous adjustment of the axis positions M, N and O of said system parts in the outer coordinate system A, the mutual actuation between the system parts being indicated by D, F and G.

At the same time the stored tool path data P are supplied from the data store U to the last system part for continuous adjustment of its axis positions P in accordance with these data, a coordinate transformation from the outer coordinate system to the inner reference coordinate system of the robot installation, which is associated with the last system part J, taking place via the junction I connecting the last system part with the other system parts.

We claim:

1. A method for programmed control of a working tool to perform processing operations on an object by means of a movable servo-actuated robot arm system having more than six degrees of freedom and on the basis of preprogrammed tool path data stored in a data memory, comprising:

deriving the stored tool path data in an outer coordinate system separate from the robot arm coordinate system;

subdividing the robot arm system into system parts for coordinate transformation to an inner reference coordinate system associated with the robot arm system and which are movable with respect to each other and each having at least six degrees of freedom;

deriving the positional data for each system part, apart from at least one system part connected with the inner reference coordinate system;

storing in a memory said positional data in addition to the preprogrammed tool path data; and using said stored data in conjunction with directly sensor-derived information as to the positional relation between said inner and outer coordinate systems as coordinate transformation data for appropriately correlating the programmed control of the working tool on the basis of the stored tool path data in the outer coordinate system at all times with the inner reference coordinate system associated with the robot arm system.

2. A method according to claim 1, further comprising the steps of:

manually controlling the working tool and the robot arm system during programming to derive said tool path data and coordinate transformation data;

individually placing each system part, apart from the said at least one system part connected with the inner reference coordinate system, for the second step of deriving and the step of storing of the positional data during said step of manually controlling at all times in such positional relation to the outer coordinate system that the working tool is capable of being guided to performing its intended processing operations by means of said at least one system part connected with the inner reference coordinate system; and performing the second step of deriving said tool path data for storage in the outer coordinate system and coordinates transformed from said inner reference coordinate system.

3. The method according to claim 1, further comprising the steps of supplying the positional data stored in the memory during the performance of the processing operations of the working tool are supplied to respective individually associated system parts for the control of a servo-actuated system associated with each system part and coordinately transforming at all times to the outer coordinate system in accordance with the data in question, simultaneously with the supplying of the stored tool path data to said at least one system part connected with the inner reference coordinate system.

4. The method according to claim 1, wherein the outer coordinate system is physically connected with, and follows the movements of, said object.

5. The method according to claim 1, further comprising the steps of:

subdividing the robot arm system into at least one system part having comparatively low motional inertia for the guidance of a working tool; and disposing a least one system part having greater motional inertia to suitably course-positioning the first system part with respect to said object for performing the processing operations.

6. Robot installation for programmed control of a working tool to perform processing operations on an object, comprising:

a movable servo-actuated robot arm system having more than six degrees of freedom and including a data memory for storing preprogrammed tool path data;

a coordinate transformation module for deriving and storing in said memory said preprogrammed tool path data defined in an outer coordinate system without physical connection with the robot arm system;

said robot arm system being subdivided into system parts movable relative to each other and each system part having at most six degrees of freedom thereby enabling suitable coordinate transformation to an inner reference coordinate system associated with the robot arm;

sensor devices for obtaining positional data for each said system part, apart from at least one system part connected with the inner reference coordinate system; and means for correlating the programmed control of the working tool in accordance with the stored tool path data defined in the outer coordinate system at all times with the inner coordinate system associated with the robot arm system using said positional data together with the positional data from said sensors as to the positional relationship between said inner and outer coordinate systems as coordinate transformation data.

7. Robot installation according to claim 6 wherein the outer coordinate system is physically connected with, and follows any movements of, the object.

8. Robot installation according to claim 6, wherein said robot arm system is also subdivided into at least one first system part having comparatively low motional inertia for guiding the working tool in accordance with the stored tool path data, and at least one second system part having higher motional inertia for coarse-positioning the first-mentioned system part in agreement with said coordinate transformation data and with respect to said object and performing the data processing operations.

9. Robot installation according to claim 8 wherein said at least one system part is a movable carrier arm having three degrees of freedom, and said said at least second system is a manipulator arm having at least six degrees of freedom and mounted at the extreme end of said carrier arm.

10. Robot installation according to claim 9 wherein said carrier arm is capable of back and forth translational movement along a path substantially parallel to a predetermined motion of said object, and pivotal movements about two mutually perpendicular axes.

11. Robot installation according to claim 9 wherein said carrier arm includes an inner portion mounted for translational movement, an intermediate portion mounted for pivotal movement about a vertical axis with respect to said inner portion, and an outer portion mounted for pivotal movement about a horizontal axis with respect to said intermediate portion.

12. Robot installation according to claim 11 wherein said outer portion has a slanting section adjacent the horizontal pivotal axis and a horizontal section at the extreme end of said outer section for mounting said intermediate portion.

* * * * *